(12) United States Patent
Truong et al.

(10) Patent No.: US 10,872,062 B2
(45) Date of Patent: Dec. 22, 2020

(54) MODERATED COLLABORATIVE EDITING IN COLLABORATIVE CONTENT ITEMS

(71) Applicant: Dropbox, Inc., San Francisco, CA (US)

(72) Inventors: Adrien Quang-Duy Truong, Stanford, CA (US); Neil Sethi, San Francisco, CA (US); Yizhou Shao, San Francisco, CA (US); Chuan Liu, San Francisco, CA (US); Chris Lesniewski-Laas, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 133 days.

(21) Appl. No.: 15/796,634

(22) Filed: Oct. 27, 2017

(65) Prior Publication Data

US 2019/0129973 A1    May 2, 2019

(51) Int. Cl.
*G06F 16/176*    (2019.01)
*H04L 29/06*    (2006.01)
*G06F 16/93*    (2019.01)
*G06F 16/18*    (2019.01)
*G06F 40/103*    (2020.01)
*G06F 40/106*    (2020.01)
(Continued)

(52) U.S. Cl.
CPC ........ *G06F 16/176* (2019.01); *G06F 16/1873* (2019.01); *G06F 16/93* (2019.01); *G06F 40/103* (2020.01); *G06F 40/106* (2020.01); *G06F 40/166* (2020.01); *G06F 40/197* (2020.01); *H04L 65/4023* (2013.01); *H04L 65/602* (2013.01)

(58) Field of Classification Search
CPC ...... G06F 16/176; G06F 17/211; G06F 17/24; H04L 65/4023
See application file for complete search history.

(56) References Cited

U.S. PATENT DOCUMENTS 7,734,690 B2 * 6/2010 Moromisato .......... G06Q 10/10
709/204
8,185,830 B2 * 5/2012 Saha ..................... G06F 16/958
715/762
(Continued)

OTHER PUBLICATIONS

Gralla, P., "How to use Excel's new live collaboration features," Aug. 1, 2017, 6 pages, [online] [retrieved from the internet May 28, 2018], Retrieved from the internet <https://www.computerworld.com/article/3212262/office-software/how-to-use-excel-live-collaboration.html>.

*Primary Examiner* — Joe Chacko
(74) *Attorney, Agent, or Firm* — Fenwick & West LLP

(57) ABSTRACT

A collaborative content management system allows users to make revisions to a collaborative content item by previewing revision suggestions without applying changes the underlying collaborative content item. The user can select a portion of the collaborative content item for revision, and modify the selected portion via a user interface. When the user interface is selected, revisions are visible to a user in place of the selected text span; when the user interface is not selected, the original text span is once again displayed. This allows a user to toggle between versions of a collaborative content item. If a user approves a suggested revision, the user can select an approval instruction causing a selected text span to be replaced by revisions made via the user interface. If a user rejects a suggested revision, the user can select a rejection instruction and the selected text span remains within the collaborative content item.

23 Claims, 18 Drawing Sheets

(51) Int. Cl.
*G06F 40/166* (2020.01)
*G06F 40/197* (2020.01)

(56) References Cited

U.S. PATENT DOCUMENTS

| | | | |
|---|---|---|---|
| 8,510,266 B1 * | 8/2013 | Ho | G06F 17/246 |
| | | | 707/609 |
| 8,682,989 B2 | 3/2014 | Meisels et al. | |
| 9,292,481 B2 | 3/2016 | Mangini et al. | |
| 9,372,858 B1 * | 6/2016 | Vagell | G06F 17/274 |
| 9,747,259 B2 | 8/2017 | Kapadia | |
| 9,817,805 B1 | 11/2017 | Markman et al. | |
| 2004/0085354 A1 * | 5/2004 | Massand | G06F 40/197 |
| | | | 715/751 |
| 2007/0067349 A1 * | 3/2007 | Jhaveri | G06F 21/6218 |
| 2008/0140732 A1 * | 6/2008 | Wilson | G06F 16/1873 |
| 2013/0268480 A1 * | 10/2013 | Dorman | G06F 16/1787 |
| | | | 707/608 |
| 2014/0298207 A1 * | 10/2014 | Ittah | G06Q 10/00 |
| | | | 715/753 |
| 2015/0113390 A1 * | 4/2015 | Vagell | G06F 17/24 |
| | | | 715/255 |
| 2016/0028796 A1 * | 1/2016 | Garcia | G06F 16/9562 |
| | | | 715/738 |
| 2016/0285890 A1 * | 9/2016 | Beausoleil | G06F 16/248 |
| 2017/0083490 A1 * | 3/2017 | Kikin-Gil | H04L 51/16 |
| 2017/0220546 A1 * | 8/2017 | Codrington | G06F 3/0484 |
| 2017/0257406 A1 * | 9/2017 | Wilde | G06F 3/0481 |

\* cited by examiner

Draft Speech ✎ —531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

<u>Now we are engaged in a great civil war, testing whether that nation, or any nation so conceived and so dedicated, can long endure.</u> We are met on a great battle field of that war. We come to dedicate a portion of it, as a final resting place for those who died here, that the nation might live. This we may, in all propriety do.

But, in a larger sense, we can not dedicate — we can not consecrate — we can not hallow, this ground -- <u>The brave men, living and dead, who struggled here, have hallowed it, far above our poor power to add or detract.</u> The world will little note, nor long remember what we say here; while it can never forget what they did here.

---

Share

Comments (7) —528

New Comment...

John Nicolay 12/16/10 at 8:25 am
I like this version better than the first draft
@file
Reply Edward Everett 12/15/10 at 11:05 pm
You say in two minutes what would take me two hours. Well done.

Bill Seward 12/15/10 at 11:10 pm
Certainly the bloodiest...
— 2 more comments —

John Hay 12/15/10 at 11:1pm
What happened to "it is altogether fitting and proper that we should do this." ???
Reply George Bancroft 12/15/10 at 11:05 pm
I would like to use this in fundraising for soliders.
@Bill_Seward your thoughts?
Reply

Recent docs    Created by me    Shared with m[e]

Draft Speech
Shared with Edward Everett and Bill Seward · You viewed 5 days ago

Draft Opinion: Gibbons v. Ogden
Shared with John Marshall · You viewed 7 days ago · Edited 7 days ago

A Brief History of Steel Production in Ohio
Shared with Robert Jackson · You viewed 10 days ago · Edited 11 days

Proposed Footnote for Carolene Products Opinion
Shared with Harlan F. Stone · You viewed 13 days ago · Edited 13 days

The Effects of Education on Interstate Commerce
Shared with William Rehnquist · You viewed 14 days ago · Edited 17 da

---

Draft Opinion: Gibbons v. Ogden

John Marshall commented    1 day ago
How do you like this ending?

John Marshall commented    2 days ago
The enumeration . . .

John Marshall commented    2 days ago
Please edit this part

A Brief History of Steel Production in Ohio

Robert Jackson commented    4 days ago
I see a zone of twilight.

Robert Jackson commented    5 days ago
What does Hugo think about this?

Draft Speech

George Bancroft commented    5 days ago
@Bill Seward your thoughts?

---

File Level Comments

John Nicolay    12/15/10 at 11:05 pm
I like this version better than the first draft George Bancroft    12/15/10 at 11:09 pm
Did anyone check the math re 4 score + 7? @file Reply

*FIG. 6A*

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

Suggestion

George Bancroft   12/15/10 at 11:05 pm replace
Four score and seven years ago with
Eighty-seven years ago Edit - Delete Share

*FIG. 8A*

Draft Speech

Here is the draft of the speech. @Bill_Seward, @John Hay, please comment.

"Eighty-seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Suggestion

George Bancroft   12/15/10 at 11:05 pm replace
Four score and seven years ago with
Eighty-seven years ago

Edit - Delete

Reply

Share

Share

Draft Speech

Here is the draft of the speech. @Bill_Seward, @John Hay, please comment.

"Eighty-seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Draft Speech

Here is the draft of the speech. @Bill_Seward, @John Hay, please comment.

"Eighty-seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Suggestion

George Bancroft    12/17/10 at 11:00 am replace
@John Hay, please comment.

with
please comment.

Edit – Delete

Share

*FIG. 9A*

Draft Speech

Here is the draft of the speech. @Bill_Seward, please comment.

"Eighty-seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

Suggestion
George Bancroft    12/17/10 at 11:00 am
replace
@John Hay, please comment.
with
please comment.
Edit – Delete George Bancroft    12/17/10 at 11:01 am
I think John's in Panama
Edit – Delete

*FIG. 9B*

Draft Speech

Here is the draft of the speech. @Bill_Seward, @John Hay, please comment

"Eighty-seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

*FIG. 9C*

Suggestion

George Bancroft   12/18/10 at 12:25 pm replace
here.

with
here.

It is for us, the living, rather to be dedicated here to the unfinished work which they have, thus far, so nobly carried on. It is rather for us to be here dedicated to the great task remaining before us that from these honored dead we take increased devotion to that cause for which they gave the last full measure of devotion that we here highly resolve that these dead shall not have died in vain; that this nation shall have a new birth of freedom; and that this government of the people, by the people, for the people, shall not perish from the earth.

Edit - Delete

Reply

--- for those who died here, that the nation might live. This we may, in all propriety do.

But, in a larger sense, we can not dedicate — we can not consecrate — we can not hallow, this ground — The brave men, living and dead, who struggled here, have hallowed it, far above our poor power to add or detract. The world will little note, nor long remember what we say here; while it can never forget what they did here.

It is for us, the living, rather to be dedicated here to the unfinished work which they have, thus far, so nobly carried on. It is rather for us to be here dedicated to the great task remaining before us that from these honored dead we take increased devotion to that cause for which they gave the last full measure of devotion that we here highly resolve that these dead shall not have died in vain; that this nation shall have a new birth of freedom; and that this government of the people, by the people, for the people, shall not perish from the earth.

Share

MODERATED COLLABORATIVE EDITING IN COLLABORATIVE CONTENT ITEMS

TECHNICAL FIELD

The disclosed embodiments generally relate to managing shared documents over a network. In particular, the disclosed embodiments are directed to managing user suggestions for revisions to shared documents.

BACKGROUND

Collaborative sharing of documents is typically provided by a network-based file sharing computer system that allows multiple users to access and edit the files. Generally, documents are created and edited by a specific type of native application, such as a word processor or spreadsheet application. Many such applications provide support for tracking changes to the content or other forms of annotation made to portions of a file, metadata associated with the file, or differences between two saved files. Typically, changes made to a document by others modify the document directly.

SUMMARY

A collaborative content management system allows users to co-edit a collaborative content item by previewing revision suggestions without applying changes to the underlying collaborative content item. The collaborative content management system receives a request to revise a portion of the collaborative content item from a user authorized to access the collaborative content item. The user can select the portion of the collaborative content item for revision, and subsequently modify the selected portion via a user interface. For example, a user may select a text portion of a document for revision, and edit the text portion by adding words or changing formatting through a user interface displayed within the collaborative content management system.

When the user interface is selected, revisions made via the user interface are visible to a user in place of the selected text portion, allowing the user to preview the revisions in the collaborative content item. When the user interface is not selected, revisions made via the user interface are not displayed, and the original text portion is once again displayed in the collaborative content item. This allows a user to toggle between a current version of a collaborative content item, and a version containing one or more suggested revisions. If a user approves a suggested revision, the user can select an approval instruction within the user interface causing a selected portion of a collaborative content item to be replaced by a revision made via the user interface. Conversely, if a user rejects a suggested revision, the user can select a rejection instruction within the user interface and the selected text portion remains within the collaborative content item.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5B shows an example user interface with a page of a collaborative content item including file-level comments, according to example embodiments.

FIG. 6A shows an example user interface with a list of collaborative content items and a list of notifications, according to example embodiments.

FIGS. 8A, 9A, and 10A illustrate a collaborative content item containing a suggested revision thread that has not been selected by a user, according to example embodiments.

FIGS. 8B, 9B, and 10B illustrate a collaborative content item containing a suggested revision thread that has been selected by a user, according to example embodiments.

FIGS. 8C, 9C, and 10C illustrate a collaborative content item with replacement text, according to example embodiments.

The figures depict various embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
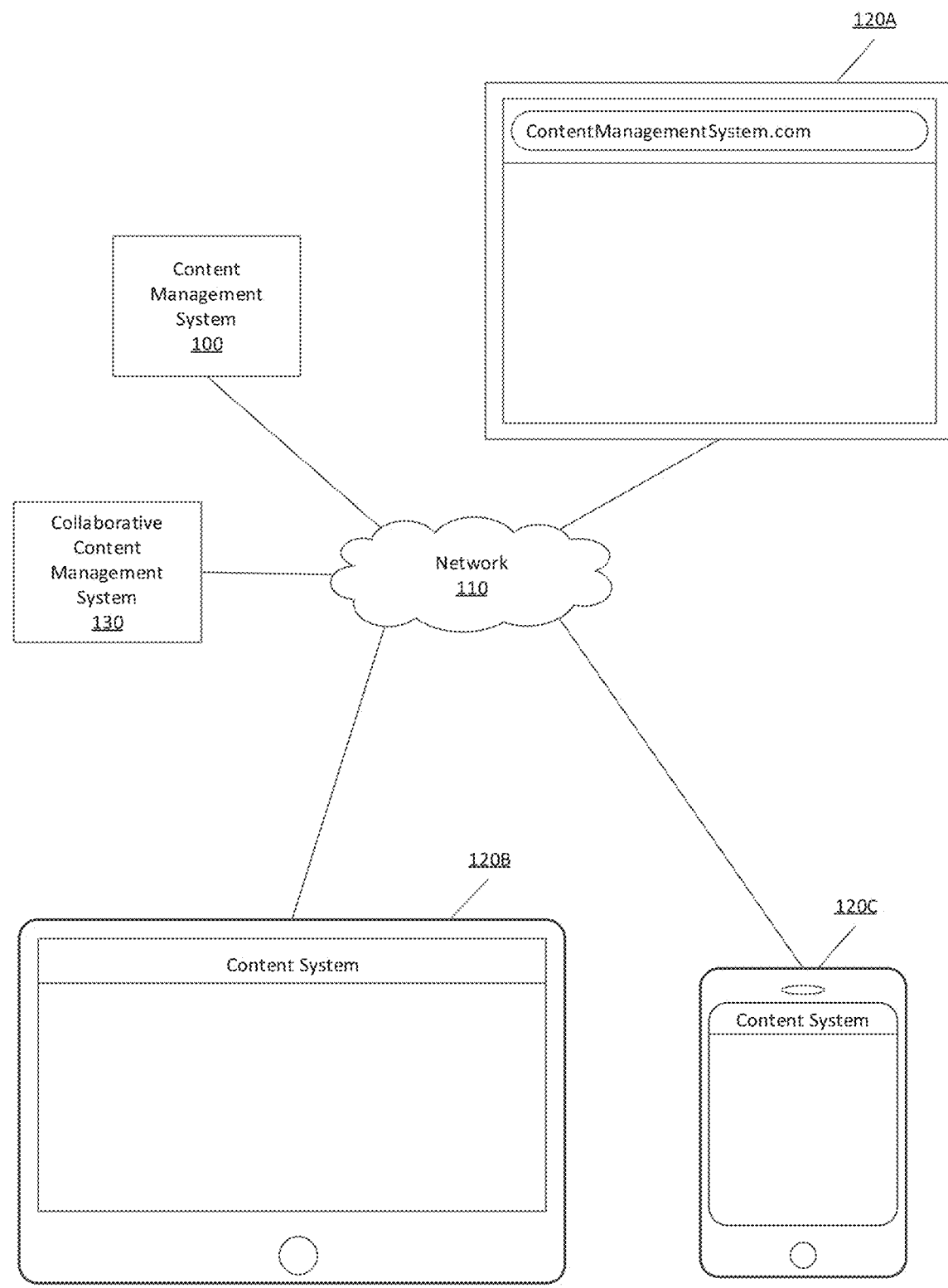
FIG. 1 shows a diagram of a system environment of a content management system and a collaborative content management system, according to example embodiments.

FIG. 1 shows a system environment including content management system 100, collaborative content management system 130, and client devices 120A, 120B, and 120C (collectively or individually "120"). The content management system 100 provides functionality for sharing content items with one or more client devices 120. In addition, the content management system 100 provides support for synchronizing content items between the content management system 100 and one or more client devices 120.

The content stored by content management system 100 can include any type of content items, such as documents, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some embodiments, the content shared by content management system 100 includes content created by using third party applications, e.g., word processors, video and image editors, database management systems, spreadsheet applications, code editors, and so forth, which are independent of content management system 100.

In some embodiments, content stored by content management system 100 includes content items (e.g., collaborative content items) created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by transmitting such content from client device 120 to content management system 100. The content provided by users is associated with user accounts that may have various privileges. For example, privileges can include permissions to see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through the network 110. The network 110 may be any suitable communications network for data transmission. In some embodiments, the network 110 is the Internet and uses standard communications technologies and/or protocols. Thus, the network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
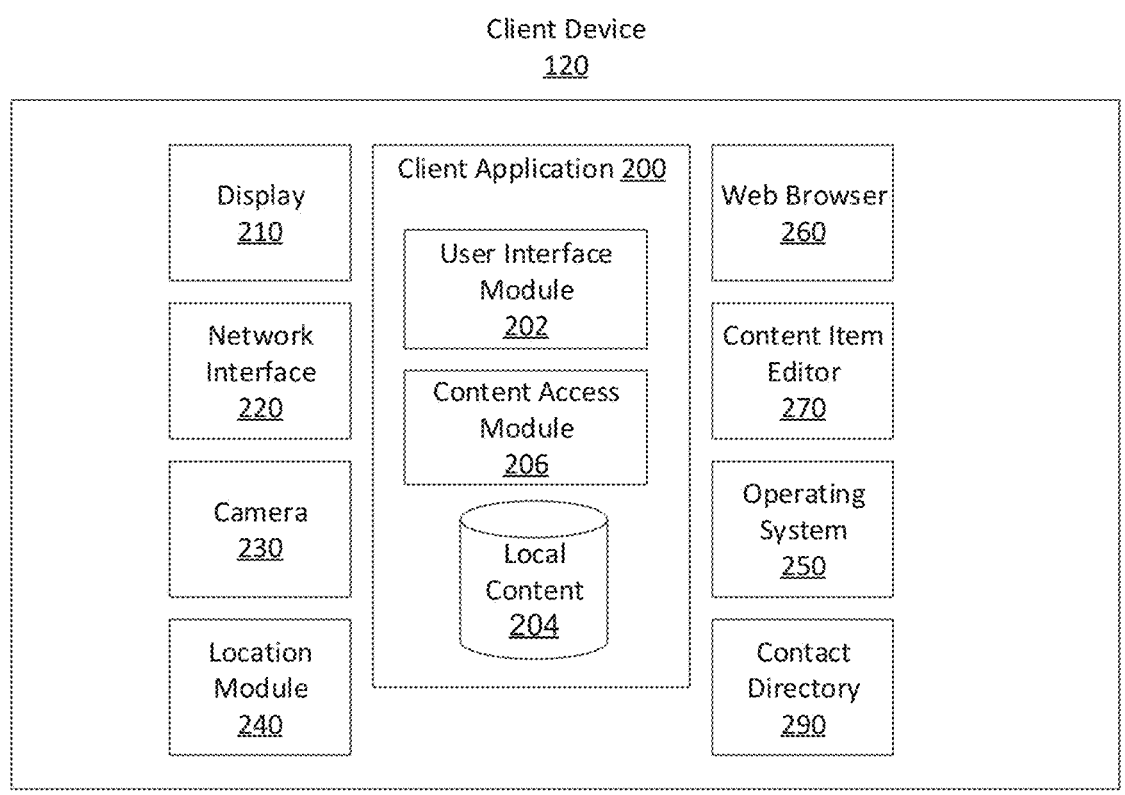
FIG. 2 shows a block diagram of the components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other components of a client device 120 that are not shown in FIG. 2 may include one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing, and modifying collaborative content items such as text documents, code files, mixed media files (e.g., text and graphics), presentations, and the like. Operating system 250 on each device provides a local file management system and executes the various software modules such as client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
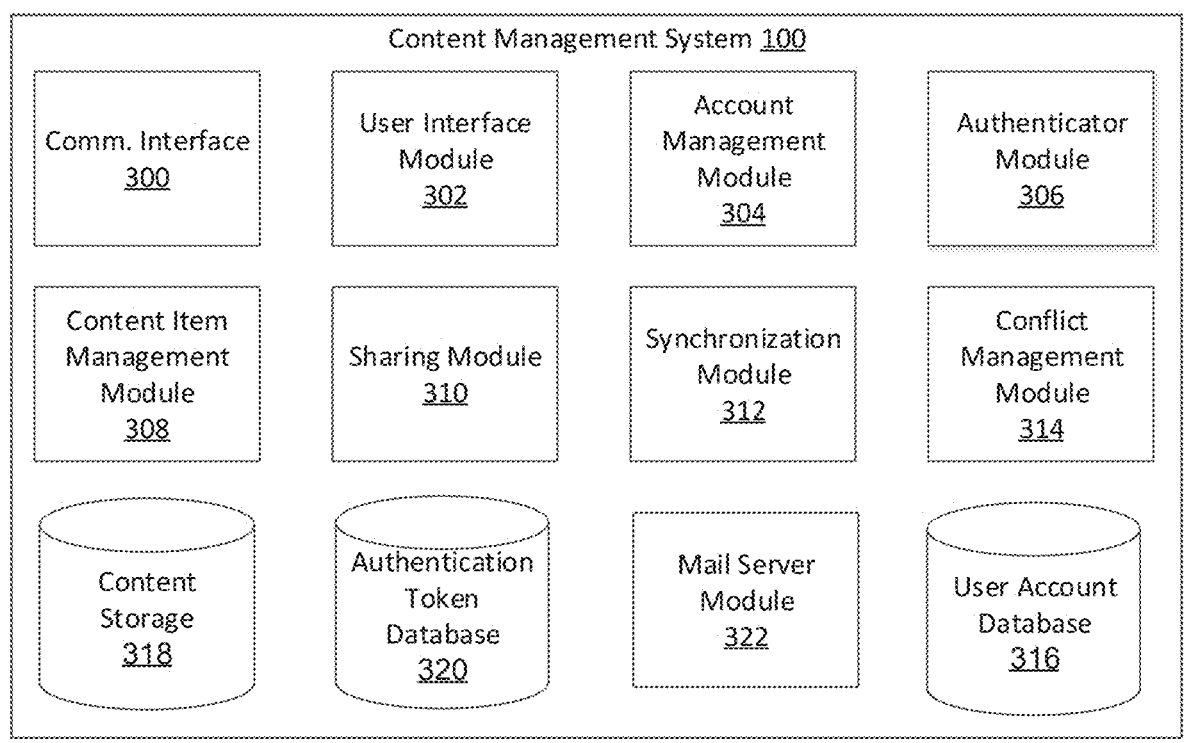
FIG. 3 shows a block diagram of the content management system, according to example embodiments.

FIG. 3 shows a block diagram of the content management system 100 according to example embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on corresponding identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type (e.g. free or paid), usage information for each user (e.g., file usage history), maximum storage space authorized, storage space used, content storage locations, security settings, personal configuration settings, content sharing data, and the like. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item (e.g., using sharing module 310) can include associating the content item with two or more user accounts and granting user permissions that provide users associated with the two or more user accounts a specified level of access to the content item. That is, the content items can be shared across multiple client devices of various types, capabilities, operating systems, etc. The content items can also be shared across various types of user accounts.

Individual users can be assigned different access privileges to a content item shared with them, as discussed above. In some cases, a user's permissions for a content item can be explicitly set for that user. A user's permissions can also be set based on a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/ groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of various types, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package (e.g., an app on a smartphone or tablet computing device) can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content item management module 308 for maintaining a content directory that identifies the location of each content item in content storage 318, and allows client applications to request access to content items in the content storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices 120 using the collaborative content management system 100. The mail server module can also be used to send and receive messages between users in the content management system.

Collaborative Content Management System

Figure 4:
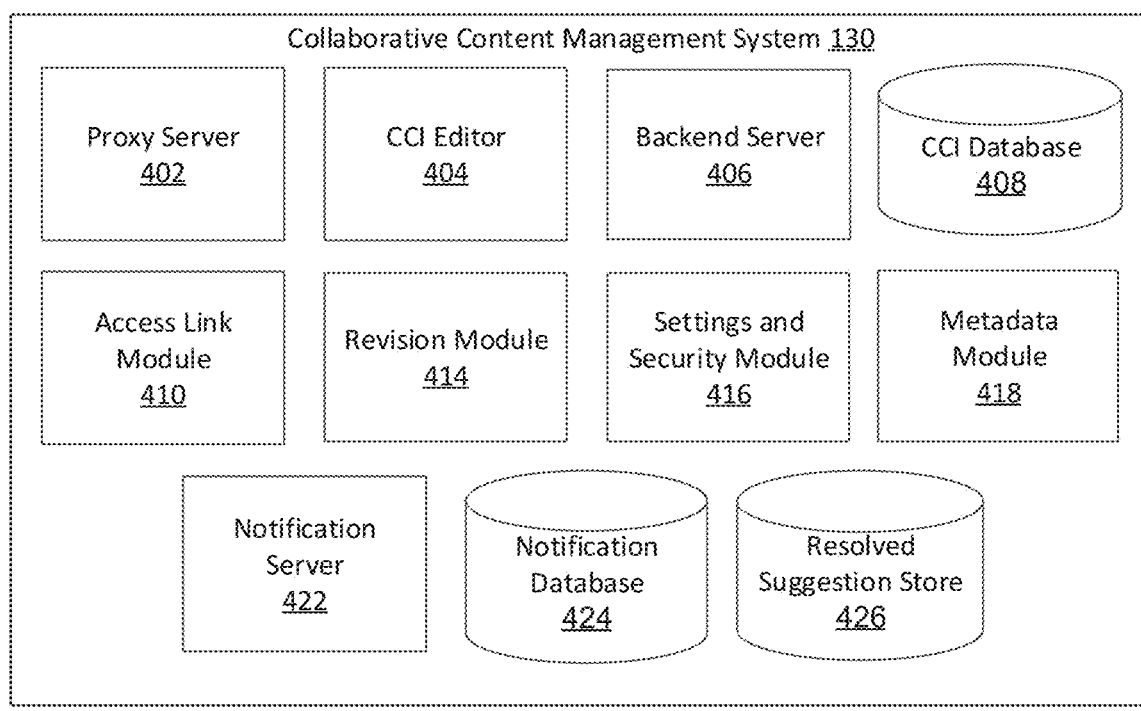
FIG. 4 shows a block diagram of the collaborative content management system, according to example embodiments.

FIG. 4 shows a block diagram of the collaborative content management system 130, according to example embodiments. Collaborative content items can be files that users can create and edit using a content items editor 270 and can contain collaborative content item elements. Collaborative content item elements may include any type of content such as text, images, animations, videos, audio, tables, lists, references to external content, programming code, tasks, tags or labels, comments, edit suggestions, or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the example of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, collaborative content item database 408, access link module 410, revision module 414, settings and security module 416, metadata module 418, notification server 422, notification database 424, and resolved comment store 426. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains several database objects representing collaborative content items, comment thread identifiers, and suggestion thread identifiers. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 returns a reference to the client application 200 allowing the client application 200 to communicate directly with the collaborative content item editor 404 for future requests. In other embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item, the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access link module 410 receives a request to provide a collaborative content item to a client device 120. In some embodiments, the access link module 410 generates an access link to the collaborative content item, for instance in response to a request to share the collaborative content item by an author. The access link can be a hyperlink including or associated with the identification information of the collaborative content item (i.e., unique identifier, content pointer, etc.). The hyperlink can also include any type of relevant metadata within the content management system (i.e., author, recipient, time created, and the like). In some embodiments, the access link module 410 can also provide the access link to user accounts via the network 110, while in other embodiments the access link can be provided or made accessible to a user account and is accessed through a user account via the client device 120. In some embodiments, the access link will be a hyperlink to a landing page (e.g., a webpage, a digital store front, an application login, etc.) and activating the hyperlink opens the landing page on a client device 120. The landing page can allow client devices 120 not associated with a user account to create a user account and access the collaborative content item using the identification information associated with the access link. Additionally, the access link module 410 can insert metadata into the collaborative content item, associate metadata with the collaborative content item, or access metadata associated with the collaborative content item that is requested.

The access link module 410 can also provide collaborative content items via other methods. For example, the access link module 410 can directly send a collaborative content item to a client device 120 or user account, store a collaborative content item in a database accessible to the client device 120, interact with any module of the collaborative content management system 130 to provide modified versions of collaborative content items, sending content pointer associated with the collaborative content item, sending metadata associated with the collaborative content item, or any other method of providing collaborative content items between devices in the network 110. The access link module 410 can also provide collaborative content items via a search of the collaborative content item database 408 (i.e., search by a keyword associated with the collaborative content item, the title, or a metadata tag, etc.).

The revision module 414 manages application level requests from client applications 200 for revising collaborative content items. The revision module 414 can create a revised collaborative content item based on suggested revisions received from one or more user accounts associated with the collaborative content item. The revision module 414 creates a suggestion thread and suggestion thread identifier for each suggested revision provided by the user accounts. In some embodiments, the suggestion threads are visible to all user accounts that are authorized to access the collaborative content item. For example, a user that is authorized to access a collaborative content item can select one or more portions of the collaborative content item for revision and can make suggested revisions that appear within the collaborative content item for other user accounts to view. The revision module 414 can store suggestion thread identifiers and a revised collaborative content item in the collaborative content item database 408 or provide the revised collaborative content item to a client device 120. Additionally, the revision module 414 can insert metadata into the revised collaborative content items, associate metadata with the revised collaborative content item, or access metadata associated with the collaborative content items that were requested for revision.

The settings and security module 416 can manage security during interactions between client devices 120, the content management system 100, and the collaborative content management system 130. Additionally, the settings and security module 416 can manage security during interactions between modules of the collaborative content management system 130. For example, when a client device 120 attempts to interact within any module of the collaborative content management system 130, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system 130. Generally, metadata can take three forms within the collaborative content management system 130: internal metadata, external metadata, and device metadata. Internal metadata is metadata within a collaborative content item: identifying information within collaborative content items (e.g., email addresses, names, addresses, phone numbers, social security numbers, account or credit card numbers, etc.); metadata associated with content elements (e.g., location, time created, content element type, content element size, content element duration, etc.); comments associated with content elements (e.g., a comment giving the definition of a word in a collaborative content item and its attribution to the user account that made the comment); suggestions associated with content elements (e.g., a suggestion for revising a particular portion of a collaborative content item and its attribution to the user account that made the suggested revision); or any other metadata that can be contained within a collaborative content item. External metadata is metadata associated with a collaborative content item but not included or stored within the collaborative content item itself: content tags indicating categories for the metadata; user accounts associated with a collaborative content item (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item. Device metadata is associated with client devices: device type; device connectivity; device size; device functionality; device sound and display settings; device location; user accounts associated with the device; device security settings; or any other type of metadata that can be associated with a client device 120. At any point the metadata module can manage metadata by changing, adding, or removing metadata.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Comment Management User Interface

Figure 5A:
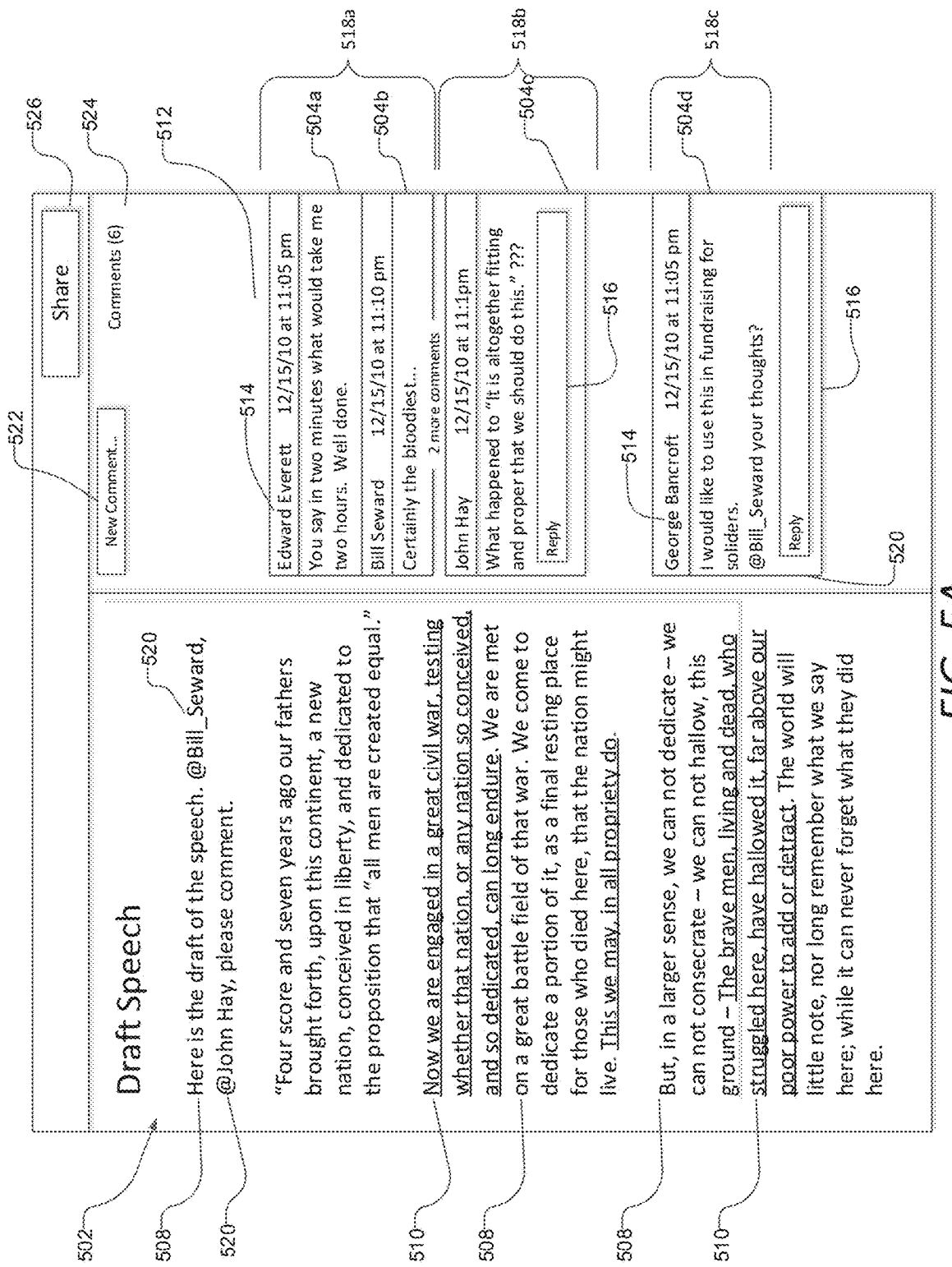
FIG. 5A shows an example user interface with a page of a collaborative content item including various comments, according to example embodiments.

Referring now to FIG. 5A, there is shown an example user interface with page of a collaborative content item 502 entitled "Draft Speech" in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) text that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some embodiments, collaborative content system 130 is configured to recognize particular text patterns as functional primitives that activate various functions of collaborative content system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In some embodiments, the user primitive takes the form of @username where the "@" symbols is a predetermined token indicates to collaborative content system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504*d*. Collaborative content system 130 recognizes these primitives as it processes the text of the collaborative content item and comments.

When a user primitive indicating a specific user appears in the span for a thread, or the text of a comment, collaborative content system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In some embodiments, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, collaborative content system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from collaborative system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. Collaborative content system 130 detects the "@doc" text string in the span of a thread or in a comment content and accesses the collaborative content item index of the collaborative content item database 408. Collaborative content system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, collaborative content system 130 may create a special ID value indicating that the "@doc" primitive has been used. Therefore, during compilation of the collaborative content item, collaborative content system 130 checks to see if a particular thread should be displayed to a viewing user by referencing the audience_list of the thread. If collaborative content system 130 detects the special ID associated with the "@doc" primitive it will reference the collaborative content item database 408 to determine which users have viewing permissions. If the user ID of the current user is included in the collaborative content item database 408 then collaborative content system 130 displays the thread to the current user.

In addition the collaborative content item audience primitive, other contextual primitives may be implemented:

The "@folder" primitive informs collaborative content system 130 that all users with access to the folder that includes the collaborative content item should be able to view the thread. In this case, some of the users that have access to the folder may not have access to the collaborative content item. In this case, collaborative content system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. Collaborative content system 130 parses this in the same way as the "@doc" primitive. However, instead of retrieving all users associated with the collaborative content item in the collaborative content item index only users with editing access are added to the audience_list for the thread. The "@sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive collaborative content system 130 accesses each thread object associated with the collaborativeContentItemID and adds any users listed in the audience_list of those threads the audience list of the current thread.

Depending on the embodiment, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-Level Comment Interfaces

Collaborative content system 130 also enables file-level commenting and may utilize a number of user interfaces depending on the embodiment. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure. However, file-level comments are not associated with a span of the collaborative content item and are instead associated with the entirely of the content item. Despite these differences, file-level comments may be used to form threads and have an associated author, creation time and date, which may be displayed in a similar fashion as in content level comments depending on the embodiment.

Because file-level comments are not associated with a particular span of the collaborative content item, different UI elements may be used to display the file-level comments. FIG. 5B illustrates an example for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment.

User Interface for Displaying a List of Notifications

FIG. 6A shows an example user interface with a list of collaborative content items 602 and a list of notifications 604. This user interface allows a viewing user to view the collaborative content items to which the viewing user has been granted access (hereinafter "the user's collaborative content items"). As referred to herein, the "viewing user" is the user viewing the user interfaces described herein. In this example, collaborative content system 130 has granted the viewing user access to multiple collaborative content items, including the five collaborative content items 606A through 606F shown in the "recent docs" tab 608 of the user interface. The user interface also includes "created by me" and "shared with me" tabs 610, 612 that the viewing user can select to access additional lists of collaborative content items.

When other users make certain types of changes to the viewing user's collaborative content items, collaborative content system 130 generates a notification of the change. Collaborative content system 130 defines one or more triggering actions. A triggering action is a change made by another user that causes collaborative content system 130 to create a notification about the change and provide the notification to the client device of the viewing user. For example, a triggering action may occur when another user adds or alters a portion of the collaborative content item, or adds a comment to a thread, for example in a thread that already includes a comment added by the viewing user.

The client application 200 receives notifications from collaborative content system 130 and can display a notification in a variety of ways. One way of displaying a notification is the notification list 604 shown in FIG. 6A. The notification list 604 includes notifications for several of the viewing user's collaborative content items, and it is displayed when the viewing user selects the notification icon 614. In the example shown in FIG. 6A, the notifications in the notification list 604 are sorted by the age of collaborative content item, and the notifications for each collaborative content item are sorted from most recent to least recent.

The client application 200 displays each notification in the notification list 604 with notification text and a short phrase indicating whether the notification relates to a comment or a portion of text in the collaborative content item content. Although not explicitly shown in FIG. 6A, each notification can also include a content span and a notification link. The content span associates the notification with a span of content in a collaborative content item 502. The notification link is a link to the collaborative content item and includes a pointer to the content span. A user input selecting a notification in the notification list 604 selects the link. The selection of the link causes the client application 200 to open the collaborative content item to a position where the content span is visible. As a beneficial result and improvement in functionality, the user does not have to scroll through the collaborative content item to find the change that was the subject of the notification.

Referring to the final notification 616 in the notification list 604 as an example, the notification text is the user primitive "@Bill Seward" and the adjacent text "your thoughts." A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user. In some embodiments, the user primitive takes the form of @username where the "@" symbol is a predetermined token that indicates to collaborative content system 130 that the following string "username" is the user name of a system user. In some implementations, other predetermined tokens can be used to indicate a primitive. If the user selects this notification 616, the notification link causes the client application 200 to open the collaborative content item 502 shown in FIG. 5A to a position where the span 510b is visible.

If the notification is generated in response to a file-level comment, the file-level comment may have no associated span in the associated collaborative content item or may set the span to be the collaborative content item title. The link included in the notification may open the collaborative content item displaying the beginning of the content or the title. [0090] In addition to displaying notifications for file-level comments in notification list 604, the client application 200 may also display a file-level thread pane 618, which displays file-level comment threads corresponding to a selected collaborative content item 620. In some implementations, file-level thread pane 618 can display file-level comment threads corresponding to multiple selected collaborative content items. In some implementations, file level thread pane 618 can display file-level comment threads corresponding to multiple of collaborative content items 606, whether or not the collaborative content items are selected. In the illustrated example, file-level comments from the collaborative content item titled "Draft Speech" are displayed in the file-level thread pane 618. In some embodiments, users may utilize the file-level thread pane 618 to add or reply to file-level comments without opening the associated collaborative content item.

In various implementations, any of collaborative content items, the associated comments, or collaborative content item file structure and other metadata can be locally stored on a client device. For example, content can be downloaded from collaborative content system 130 for use in an offline mode. The inclusion of a file-level thread pane 618 may be especially beneficial for this offline use where file-level comments may be downloaded for offline viewing in the file-level thread pane 618. This would allow users to receive some information about collaborative content items without having to store the enter contents of the collaborative content items locally. For example, users may view file-level comments for collaborative content items listed in file-level thread pane 618, without requiring the collaborative content items to also be locally stored.

Database Structures

Figure 6B:
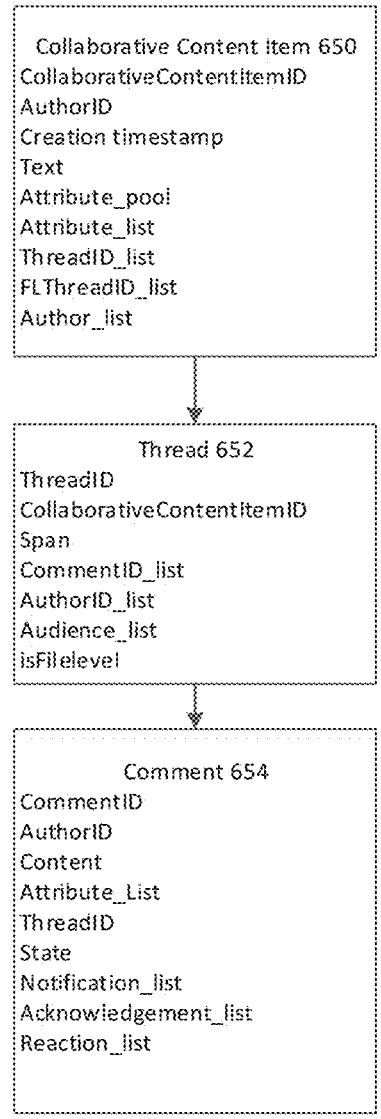
FIG. 6B shows an example of the data structures for documents, comments, and threads, according to example embodiments.

Referring to FIG. 6B, collaborative content item database 408 (CCI database) stores the collaborative content items, content level and file-level comments, and threads as database entities, and provides programmatic access thereto for searching and retrieving these entities and is one means for performing these functions. The CCI database 408 can be implemented in a relational form using separate tables for collaborative content items, threads, and comments, or using objects, BLOBs, files, or other structures. Additionally, the CCI database 408 may provide a folder hierarchy storage system separate from content management system 100. In this case, folders would be saved as an additional data structure in the CCI database 408.

Each collaborative content item data element 650 is composed of a number of elements. In some embodiments, the elements are as follows:

CollaborativeContentItemID: a unique identifier assigned by collaborative content system 130 to access the collaborative content item.

AuthorID: the userID of the user who created the collaborative content item, and may include the username of the user. These values may be encrypted for privacy.

Creation timestamp: indicates the date and time that the collaborative content item was created.

Text: The text of the collaborative content item is represented as string of ASCII characters.

Attribute_pool: Formatting attributes (e.g., bold, underline, italics, font, font size, line spacing, paragraphs, and the like) that are used in the collaborative content item. The attribute pool is a set of attributeIDs used in the collaborative content item; a native set of attributeIDs and associated formats are provided by collaborative content system 130. The following table is an example of a portion of an attribute pool:

| Attribute ID | Formatting |
|---|---|
| 0 | None |
| 1 | Bold |
| 2 | Italic |
| 3 | Underline |
| 4 | Strikethrough |
| 5 | Superscript |
| 6 | Subscript |
| 7 | Single Space |
| 8 | Doublespace |
| ... | ... |

Attribute_list: Formatting attributes are applied to portions of a content item, such as text, by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaborative content item is coded for attributes. For example, the text "Text with bold, italic, and bold italic formatting." would be attribute coded as {10=0, 4=1, 2=0, 6=2, 6×0, 11=12, 12=0}.

ThreadID_list: a list of all threads that are associated with a collaborative content item. ThreadIDs in the ThreadID_list may represent threads of content level comments or threads of file-level comments.

FLThreadID_list: a list of all file-level threads 528 that are associated with a collaborative content item. Thus, the FLThread_list contains a subset of the threads in Thread ID list.

Author_list: a sequential list of the users who have contributed to the collaborative content item text, according to the sequence of contributed or edited text portions, using the same coding pattern as attribute list, i.e., (span=userID) pairs. For example, the author_list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of content. For example, when text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example, with the userID of each author followed by a list of text portions edited by that user.

Each thread data element 652 is composed of a number of elements. In some embodiments, thread data element 652 includes the following elements:

ThreadID: unique identifier assigned by collaborative content system 130.

CollaborativeContentItemID: the CollaborativeContentItemID of the file that contains the thread.

Span: a delineated portion of the content of the identified collaborative content item to which the thread applies. The delineated portion is defined based on the type of the content. For example, a span in text can be defined by the position of the first character in the span, and the length of the span (in number of characters); a span in an image can be defined by a bounding region, for example a set of (X,Y) coordinates, relative to the image origin that define a polygon within the region; a span in a spreadsheet can be defined by a range of cells by column and row numbers. For example, the span (50, 25) indicates a text portion starting at character position 50 within the collaborative content item and running 25 characters in length. As the content in the collaborative content item is edited, collaborative content system 130 updates the span element of each thread. For example, if a five-character portion of the text before the span (50, 25) is deleted, then content management system 100 will modify the span of the thread to (45, 25). It is also possible for users to delete text included in the span. If all of the text included in the span of a thread is deleted, then the span will have a null value and is removed by collaborative content system 130 (unless isFilelevel is True as described below).

In some implementations, only content level comments are associated with a span, in this case a thread of file-level comments may have a null value for a span accompanied by a True value for the is Filelevel element. This is one mechanism for a thread of comments to persist in the CCI database 408 until the thread of comments is deleted, no matter what other content in the collaborative content item is removed or edited. For example, the title of a collaborative content item can be modified (e.g., edited or deleted). This change may not affect the file-level comment, even though file-level comment can be displayed as being associated with the collaborative content item title. For example, if a collaborative content item title is deleted, a file-level comment can remain attached to a field or other designated title location within the collaborative content item. As another example, a user can edit a collaborative content item title. A file-level comment can remain attached to a designated title location within the collaborative content item that contains the edited collaborative content item title.

CommentID_list: a list element of commentIDs of the comment data elements (e.g., comment data elements 654) included in the thread corresponding to thread data element 652.

AuthorID_list: a list of userIDs of the authors of comments in the thread.

Audience_list. The Audience_list element is a list indicating the users to whom the thread and its comments are displayed when accessing the collaborative content item, and to whom notifications of changes in the thread are sent. The audience for a thread can be determined differently for file-level comments than for content level comments. In various implementations, the audience of a content level thread may comprise one or more of the userIDs of the i) the author of the collaborative content item containing the thread; ii) the authors of comments included in the thread; iii) the authors of any text included in the span for the thread; iv) any user mentioned in the span the thread via a user primitive (further described below); v) any user mentioned in a comment via user primitive; or vi) any user who has opened the collaborative content item; vii) any user who has edited the collaborative content item; or viii) any user who has created an association with the collaborative content item, such as by marking it as a favorite or followed collaborative content item. In some implementations, an audience for the thread may not be defined specifically for the thread, but instead may be identified dynamically as needed based on, e.g., user identifiers associated with the comments or with the collaborative content item. The inclusion of an audience for each thread allows for control of which users are notified of, and have access to specific comments as further described below.

isFilelevel: a value indicating whether the thread is a file-level thread (associated with the collaborative content item as a whole as opposed to a particular span) or whether the thread is a content level thread (associated with a particular span in the collaborative content item). Before deleting a content level thread for having a null span, collaborative content system 130 checks the isFilelevel value for the thread to determine whether it should be deleted. If isFilelevel is True, the thread will not be deleted. The isFilelevel element is also used to determine how a thread is displayed. If isFilelevel is True the thread is displayed in the collaborative content item as a file-level thread with no associated span. If isFilelevel is False then the thread is displayed as a content level thread and the associated span is highlighted in the collaborative content item.

Each comment data element 654 is composed of a number of elements. In some embodiments, comment data element 654 includes the following elements:

CommentID: a unique identifier assigned by collaborative content system 130.

AuthorID: the userID of the author of the comment.

Content: an element storing the content of the comment, which may include text, pictures, or other media.

Attribute_list: a list storing the formatting attributes for the text of the comment, in the same manner as described above for collaborative content items.

ThreadID: the threadID of the thread to which the comment belongs.

State: an enumerated variable storing a value indicating the state of the comment as either active or resolved.

Notification_list: the Notification_list element is a list of userIDs indicating the users to whom a notification of the comment has been sent, as further explained below. This list is updated each time a notification message including the comment is sent to specific user.

Acknowledgement_list: the Acknowledgement_list element is a list of userIDs indicating the status of each user with respect to the comment. For example, the Acknowledgement_list may indicate whether each user in the Audience_list of the thread has yet viewed the comment, has read the comment, acknowledges an instruction in the comment, or intends to respond later to the comment, or any other set of enumerated actions or status types. In various implementations, this list can be updated whenever the collaborative content editor 404 displays the comment to a user that has not yet seen the new comment or when a user selects a control in relation to a comment indicating the user's acknowledgement of the comment or the user's intention to respond to the comment. In some embodiments, the collaborative content editor 404 may display a visual indication of users that have viewed a particular comment proximate to the comment in the display. Additionally, collaborative content system 130 may provide UI elements for indicating status beyond applying a "read receipt" when a user views a comment for a first time.

Reaction_list: reactions are elements that represent reactions of each user in the audience of the thread to the comment. The reaction list comprises a list of reaction values paired with userIDs. In some embodiments, an interface for providing reactions to each comment is provided and a user may select a reaction using a pull down feature or another such UI feature. An enumerated set of reactions is natively provided (e.g., "Approve," "Disapprove", "Happy", "Angry", "Puzzled" with associated numeric codes 1 . . . 5). Upon selection of a reaction from a reaction interface the numeric code corresponding to the selected reaction is added to the reaction list. For example, reaction pair (345, 5) would indicate that the user with userID 345 had an angry reaction to the comment. In some embodiments, the collaborative content editor 404 displays a visual indication of each reaction proximate to the comment in the display.

User information is also stored as database entities. Each user includes the following elements:

DocumentID_List: a list of collaborative content item identifiers accessible by the user of the user identifier.

RoomID_List: a list of room identifiers of comment rooms accessible by the user of the user identifier. A user may have access to multiple comment rooms for a single collaborative content item.

AnonymousUserID_list: a list of anonymous user identifiers associated with the user. An anonymous user identifier for the user may be generated for each of the collaborative content items based on the user identifier of the user and the document identifier of the collaborative content item. In some embodiments, anonymous user identifiers are not stored by the system, but instead are reconstructed based on the stored user identifier and document identifier.

ThreadID_list: a list of threads in which the user has posted a comment, or is otherwise allowed to access.

Avatar: an identifier that references an avatar, such as an image, associated with the user. The avatar is used as a representation of the user. The avatar may be presented when the user provides a comment or updates a collaborative content item to attribute changes to the user.

AnonymousAvatars_list: a list of anonymous avatars associated with anonymous user identifiers of the user. Each anonymous user identifier may be associated with a different anonymous avatar identifier. In some embodiments, anonymous avatars are not stored in association with users, but instead are referenced by the anonymous user identifier.

CCI database 408 may also include a set of indices. These indices are logical in nature and may be implemented in various ways, depending on the underlying database design. A user index contains a list of all users by their userID, and for each userID there is a list of collaborativeContentItemIDs. Each collaborativeContentItemID identifies a collaborative content item to which the user of the userID is associated and has access to. For each collaborativeContentItemID, there is a status indicator that indicates whether the collaborative content item is active or inactive for the user. A collaborative content item is active for the user sharing the collaborative content item until the user deletes the collaborative content item. In some embodiments, when the user deletes the collaborative content item, the collaborative content item persists in the collaborative content item database 408 remains associated with the user but status indicator is set to inactive, allowing the user to reactivate their sharing status with the collaborative content item in the future. The collaborative content item remains active for and associated with any other shared users. Alternatively, the collaborative content item may be deleted from the item database 408, so that none of the shared users have access to it anymore. The user index is used to identify collaborative content items associated with (shared with) a given user and the status of those collaborative content items with respect to the user. In some embodiments, a userID index also indicates the privileges the user has with respect to each document that the user is associated with. A value stored with each collaborativeContentItemID in the index indicates whether the user has editing privileges, viewing privileges, and/or sharing privileges.

Collaborative content item database 408 can include a collaborative content item index. The collaborative content item index indicates, for each document, a list of userIDs of users having access to the collaborative content item, and an indication of whether the user is active or inactive. This index can be an inverse of the user index and may be stored together with the user index. The collaborative content item index may also indicate the privileges of each user associated with the collaborative content item using an inverse implementation of the above described user index.

Suggested Revisions

Figure 7:
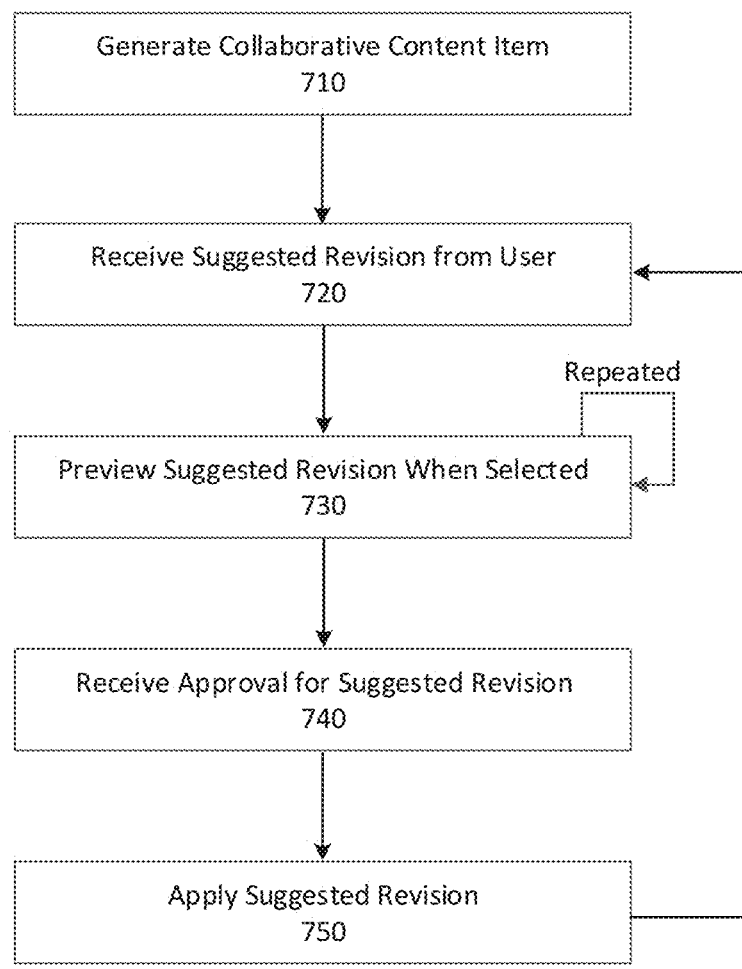
FIG. 7 shows an example of a process for applying suggested revisions, according to example embodiments.

As used herein, a "suggested revision" refers to the use of the collaborative content management system 130 by a plurality of users to edit, or otherwise modify, a collaborative content item. One example of a suggested revision includes the use of the collaborative content management system 130 to edit an author-generated text document among users authorized to make suggested revisions to text portions within the document. FIG. 7 is a flowchart broadly illustrating a process for making suggested revisions in a collaborative content item. Additional features associated with suggested revisions are described in greater detail with regards to FIGS. 8A-9.

Suggesting a revision begins in a manner similar to making comments as discussed above in reference to FIGS. 5A-B. A suggested revision, in various embodiments, is a type of comment. Similar to a comment, a suggested revision thread and suggestion thread identifier are created when a user selects a content level or file-level text span within a collaborative content item upon which to suggest revisions. A collaborative content item can have zero or more suggested revision threads. After a suggested revision thread is created with respect to a text span, the user may edit the text span (e.g., by adding or deleting words, changing formatting, etc.) via a user interface displayed within the suggested revision thread. In some embodiments, the suggested revision thread is located in comment pane 512, adjacent to the text span with which the suggested revision thread is associated. When the suggested revision thread is selected by a user, the selected text span is replaced with a preview of proposed replacement text suggested via the user interface. However, when the user deselects the user interface by clicking outside of the suggested revision thread, for example, the original text span is restored within the collaborative content item. By selecting and deselecting a suggested revision thread, a user can toggle between versions of the collaborative content item before a selected text span is replaced with proposed replacement text. This allows users increased flexibility in suggesting revisions to a collaborative content item in that users need not be apprehensive about modifying the content provided by other users.

In addition, a user may comment on suggested revisions. This feature allows a user to provide an explanation, or reasoning, for suggesting a particular revision to the other users authorized to access the collaborative content item, or to comment on suggested revisions created by others. For example, if user A suggests a revision to a text span within a text document shared among users A, B, and C, user A may explain to users B and C the rationale behind user A's suggested revision in a comment posted below the suggested revision. Subsequently, users B and C can comment on user A's comment regarding the suggested revision, and provide their insight regarding modifying the collaborative content item before any edits occur to the actual text span in the document. This communication allows users to collaborate in an environment that minimizes intrusive modifications to a collaborative content item while providing an avenue for discussion among users regarding suggested revisions.

Suggested Revision Process

FIG. 7 illustrates a process for making a suggested revision in a collaborative content item, according to example embodiments. In the example illustrated in FIG. 7, the collaborative content management system 130 can generate 710 a collaborative content item in response to receiving input from an author client device 120. In one example embodiment, collaborative content management system 130 can receive 720 a suggested revision from a user authorized to access the collaborative content item that has selected a text span for revision. Revision module 414 can identify the text span and create a suggested revision thread and suggestion thread identifier. In another example embodiment, a collaborative content item may receive revisions from a user made directly to text displayed within the collaborative content item. A user can simply begin adding, deleting, or otherwise modifying, text within the collaborative content item, and the collaborative content management system 130 can automatically display these revisions in a suggested revision thread. In yet another example embodiment, a user can select a text span for revision and can begin making revisions within the text span. Revisions made to the text span are displayed in a suggested revision thread. In each of these example embodiments, revision module 414 stores the suggestion thread identifier in collaborative content item database 408. When a user authorized to access the collaborative content item and suggested revision thread clicks within, or otherwise interacts with, a user interface containing a suggested revision to the text span, revision module 414 can locate the suggestion thread identifier corresponding to the suggested revision thread and preview 730 the suggested revision in the collaborative content item, replacing the text span with the suggested revision. If the user clicks outside of the user interface, or otherwise interacts with the surrounding collaborative content item, the text span is restored and the previewed collaborative content item is no longer visible to the user until the user selects the user interface again. If the user approves of the suggested revision, the collaborative content management system 130 receives 740 an approval instruction indicating that the selected text span should be replaced by the suggested revision. Upon receiving approval of the suggested revision, revision module 414 applies 750 the suggested revision to the collaborative content item, removes the suggested revision thread from display of the user, and stores elements associated with the suggested revision thread in the resolved suggestion store 426. Elements associated with a suggested revision thread can include, for example, text span elements, replacement text elements, and comment lists.

To further illustrate the process described above, FIGS. 8A-8C exemplify a typical use case in which an author of a collaborative content item, or a portion thereof, may accept a suggested revision containing proposed replacement text. In this example, as well as the following examples, the collaborative content item is a text document shared among users of the collaborative content management system 130. In addition, the suggested revisions pertain only content level suggestions. However, other embodiments of suggested revisions may apply to various forms of collaborative content items (e.g., text files, audio files, image files, video files, and the like), for content level and file-level suggestions.

Replacement of Text Span

FIG. 8A illustrates a collaborative content item containing suggested revision thread 804 that has not been selected by a user, according to example embodiments. In the example illustrated in FIG. 8A, collaborative content item 502 is the text document entitled "Draft Speech" previously discussed in FIG. 5A. The text document includes text span 800 and a corresponding suggested revision thread 804 including suggestion window 802a, userID window 802b, and proposed replacement text window 802c within comment pane 512 adjacent to text span 800. In userID window 802b, it is shown that user "George Bancroft" selected text span 800 and created suggested revision thread 804 on "12/15/10 at 11:05 pm." In proposed replacement text window 802c, it is shown that "George Bancroft" would like to replace text span 800 "Four score and seven years ago" with proposed replacement text "Eighty-seven years ago." However, because suggested revision thread 804 has not been selected by a user—that is, it does not currently have the focus—the existing text span 800 is displayed within the body of "Draft Speech," and a preview of the proposed replacement text is not displayed.

FIG. 8B illustrates collaborative content item 502 containing suggested revision thread 804 that has been selected by a user, according to example embodiments. In the example illustrated in FIG. 8B, text span 800 has been replaced with a preview of proposed replacement text 806 shown in proposed replacement text window 802c. In addition, suggestion window 802a displays approval button 808 and rejection button 810, used by a user authorized to access collaborative content item 502 to either approve the suggested revision or reject the suggested revision, respectively. In the event that a user approves the suggested revision, revision module 414 can replace the text span with proposed replacement text 806; if the user rejects the suggested revision, revision module 414 can restore the text span in collaborative content item 502 and end the preview. A user authorized to access collaborative content item 502 may also provide a reply to the suggested revision in reply window 802d. Reply window 802d allows users authorized to access collaborative content item 502 to express their opinions on the proposed replacement text. Several users may provide replies within suggested revision thread 804, resulting in several comments nested within suggested revision thread 804. Collaborative content management system 130 creates a comment thread and comment thread identifier for comments nested within suggested revision thread 804, and can store the comment thread identifier associated with suggestion thread identifier in collaborative content item database 408.

FIG. 8C illustrates collaborative content item 502 with replacement text 806, according to example embodiments. In the example illustrated in FIG. 8B, text span 800 "Four score and seven years ago" has been replaced by replacement text 806 "Eight-seven years ago" that was approved by a user. In addition, suggested revision thread 804 is no longer visible within comment pane 512. Since the suggested revision was accepted, revision module 414 replaced underlying attributes associated with text span 800 with underlying attributes of replacement text 806. By replacing these underlying attributes, the collaborative content management system 130 causes replacement text 806 to be displayed on client device 120 when collaborative content item 502 is rendered. Revision module 414 also stores elements associated with suggested revision thread 804 in resolved suggestion store 426. These elements can include text span elements, replacement text elements, comment lists, whether a suggested revision thread was approved or rejected, etc. By storing these elements, collaborative content management system 130 can create a historic record of collaborative content item 502 versions throughout the revision process.

Deletion of Text Span

FIG. 9A illustrates collaborative content item 502 containing suggested revision thread 904 that has not been selected by a user, according to example embodiments. In the example illustrated in FIG. 9A, text span 900 "@John Hay, please comment" has been selected by "George Bancroft" on "12/17/10 at 11:00 am" as shown in the userID window 902b. Proposed replacement text window 902c contains proposed replacement text that contains a deletion of "@John Hay" from the text span 900. In the event a user approves this proposed replacement text, a portion of the text span 900 would be deleted from the text span 900. In this way, suggested revisions can support the deletion of text spans in addition to modifying or adding to existing text spans. Similar to the example in FIG. 8A, the proposed replacement text is not displayed with the body of "Draft Speech" because suggested revision thread 904 has not yet been selected by a user.

FIG. 9B shows collaborative content item 502 containing suggested revision thread 904 that has been selected by a user, according to example embodiments. In the example illustrated in FIG. 9B, text span 900 has been replaced by a preview of proposed replacement text 906 shown in proposed replacement text window 902c. Suggested revision thread 904 also now displays reply window 902e. Reply window 902e contains text provided by user "George Bancroft" on "12/17/10 at 11:01 am" which states "I think John's in Panama." Here, suggested revision thread 904 describes proposed replacement text 906 in proposed replacement text window 902c, and a reasoning behind suggesting this revision as shown in reply window 902e. This affords other users authorized to access collaborative content item 502 with a reasoning behind the suggested revision, and an opportunity to provide feedback in a reply window as well before making an approval or a rejection.

FIG. 9C shows collaborative content item 502 without replacement text 906, according to example embodiments. In the example shown in FIG. 9B, text span 900 "@John Hay, please comment" has been restored to the body of "Draft Speech." This indicates that suggested revision thread 904 was rejected by a user that selected rejection button 810. Similar to FIG. 8C, suggested revision thread 904 is not visible in comment pane 512 after suggested revision thread 904 has been resolved. In addition, revision module 414 stores elements associated with suggested revision thread 904 in resolved suggestion store 426 in order to continue building historic record of collaborative content item 502 versions as collaborative content item 502 is revised.

Addition to Text Span

Figure 10A:
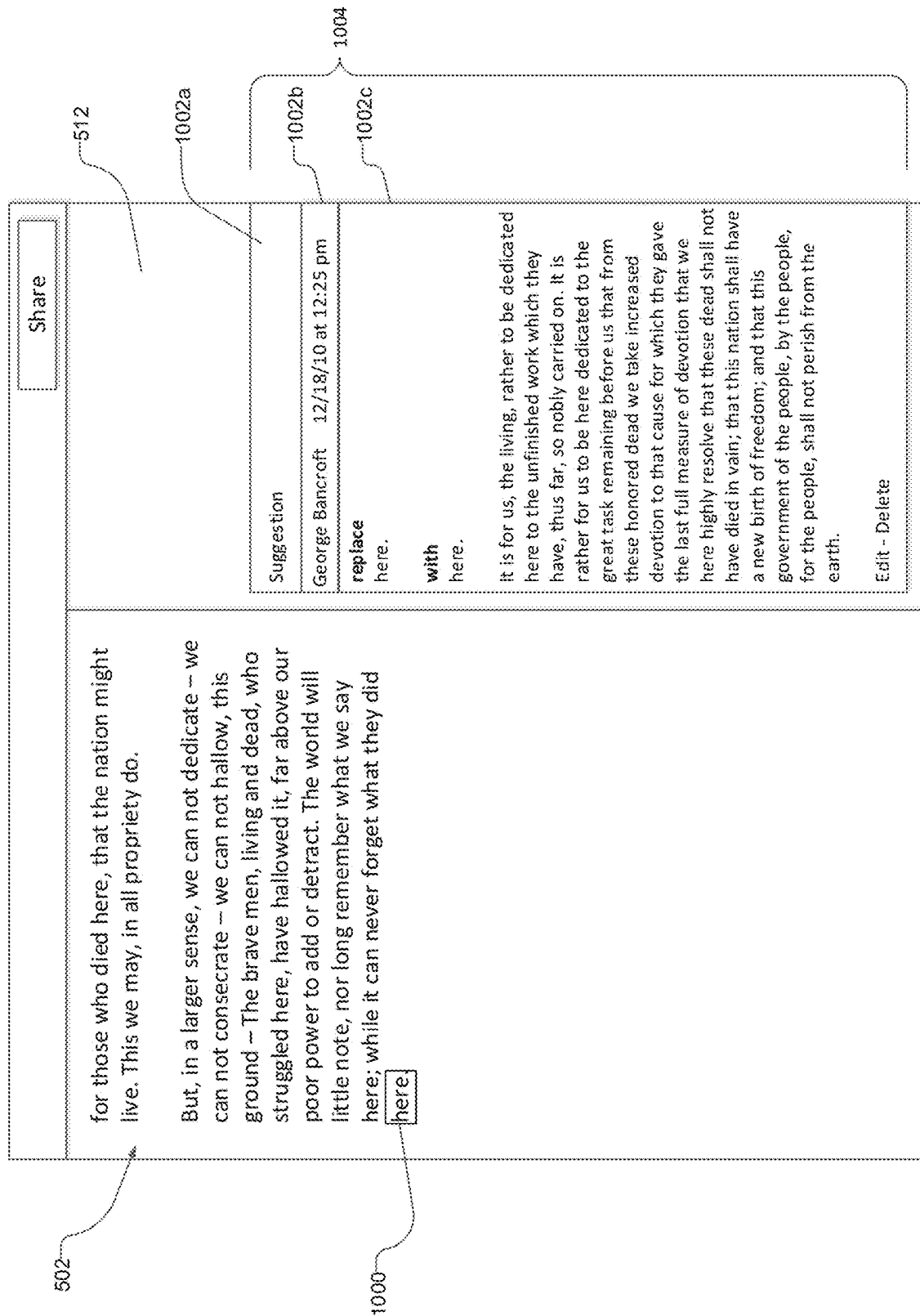

FIG. 10A illustrates collaborative content item 502 containing suggestion revision thread 1004 that has not been selected by a user, according to example embodiments. In the example illustrated in FIG. 10A, text span 1000 ("here.") has been selected by "George Bancroft" on "12/18/10 at 12:25 pm" as shown in the userID window 1002b. Proposed replacement text window 1002c contains proposed replacement text that contains additional text "It is for us, the living, rather to be dedicated here . . . " to be added to the text span. In the event a user approves this proposed replacement text, the text span 1000 would have a paragraph appended to the end of collaborative content item 502. In this way, suggested revisions can support additions of text to a selected text span, allowing a user to further elaborate on portions of collaborative content item 502 that might need additional information. Similar to the examples in FIGS. 8A and 9A, the proposed replacement text is not displayed with the body of "Draft Speech" because suggested revision thread 1004 has not yet been selected by a user.

FIG. 10B shows collaborative content item 502 containing suggested revision thread 1004 that has been selected by a user, according to example embodiments. In the example illustrated in FIG. 10B, text span 1000 has been replaced by a preview of proposed replacement text 1006 show in proposed replacement text window 1002c. In addition, suggestion window 1002a displays approval button 808 and rejection button 810, used by a user authorized to access collaborative content item 502 to either approve the suggested revision or reject the suggested revision, respectively. In the event that a user approves the suggested revision, revision module 414 can replace the text span with proposed replacement text 1006; if the user rejects the suggested revision, revision module 414 can restore the text span in collaborative content item 502 and end the preview. A user authorized to access collaborative content item 502 may also provide a reply to the suggested revision in reply window 1002d. Similar to the suggested revision thread 804 shown in FIG. 8B, collaborative content management system 130 creates a comment thread and comment thread identifier for comments nested within suggested revision thread 1004, and can store the comment thread identifier associated with suggestion thread identifier in collaborative content item database 408.

Figure 10C:
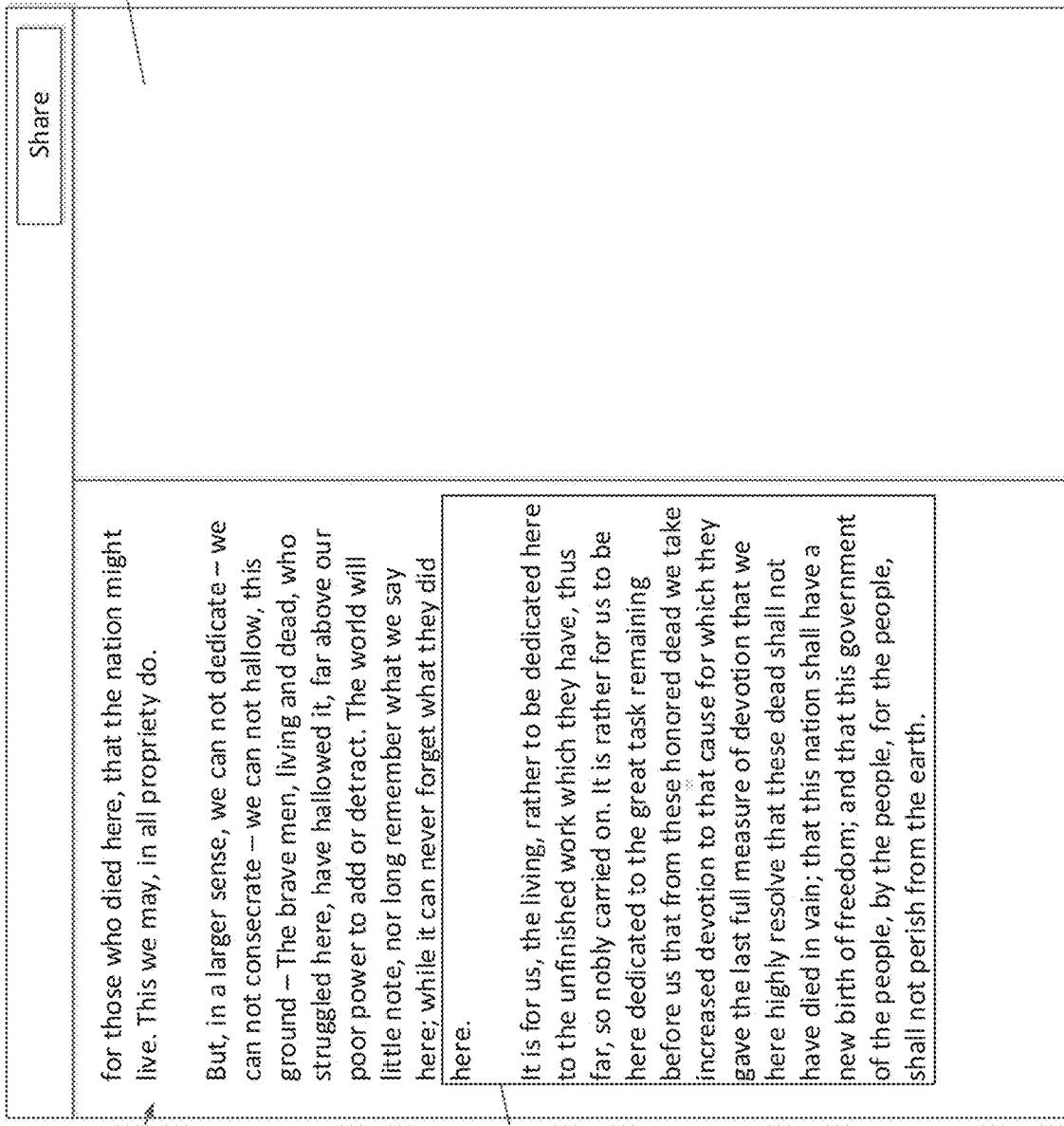

FIG. 10C illustrates collaborative content item 502 with replacement text 1006, according to example embodiments. In the example illustrated in FIG. 10B, text span 1000 "here." has been revised to include an additional paragraph that was approved by a user. In addition, suggested revision thread 1004 is no longer visible within comment pane 512. Since the suggested revision was accepted, revision module 414 replaced underlying attributes associated with text span 1000 with underlying attributes of replacement text 1006. By replacing these underlying attributes, the collaborative content management system 130 causes replacement text 1006 to be displayed on client device 120 when collaborative content item 502 is rendered. Revision module 414 also stores elements associated with suggested revision thread 1004 in resolved suggestion store 426.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present technology is not described with reference to any particular programming language. It will be appreciated that a variety of programming languages may be used to implement the teachings of the present technology as described herein, and any references below to specific languages are provided for disclosure of enablement and best mode of the present technology.

While the technology has been particularly shown and described with reference to a preferred embodiment and several alternate embodiments, it will be understood by persons skilled in the relevant art that various changes in form and details can be made therein without departing from the spirit and scope of the technology.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method for collaborative editing of a content item, the method comprising:
   receiving a plurality of comments from a plurality of users within a same copy of a collaborative content item stored by a collaborative content management system, the comments each associated with a respective text span in the same copy of the collaborative content item and including respective proposed replacement text for respective text spans;
   responsive to receiving a respective comment of the plurality of comments from a first user of the plurality of users, causing display of the respective comment in the same copy of the collaborative content item without causing display of the respective proposed replacement text in the text span, wherein the same copy is updated to include the respective comment, for display to an author of the collaborative content item, the first user, and a second user of the plurality of users, at a same time based on the first user and the second user being part of a first audience list that is specific to the respective comment;
   responsive to receiving a user selection of the displayed comment from the author, causing display of the respective proposed replacement text in the same copy of the collaborative content item in lieu of the respective text span while also causing display of another comment of the plurality of comments added by the second user to the author but not the first user based on the author being part of a second audience list that is specific to the another comment and the first user not being part of the second audience list, the second audience list indicating that only users that are part of the second audience list are to be enabled to see the another comment;
   responsive to the displayed comment not being selected by the author, causing display of, within the same copy of the collaborative content item, the text span in lieu of the respective proposed replacement text while also causing display of the another comment added by the second user to the author but not the first user based on the author being part of the second audience list and the first user not being part of the second audience list, wherein display of the respective proposed replacement text in the text span is not caused responsive to receiving a user selection of the displayed comment from a user other than the author;
   receiving an approval instruction for the respective proposed replacement text; and
   responsive to receiving the approval instruction, removing the displayed comment and replacing the text span in the same copy of the collaborative content item with the respective proposed replacement text.

2. The method of claim 1, wherein causing display of the respective comment comprises:
   creating a thread, the thread having a comment list, a text span element, and a replacement text element;

associating the respective text span with the text span element of the thread;
associating the respective proposed replacement text with the replacement text element of the thread; and
associating the respective comment with the comment list of the thread.

3. The method of claim 1, wherein the displayed comment is positioned adjacent to the respective text span, and wherein the approval instruction is received via a user interface element displayed in association with the respective proposed replacement text.

4. The method of claim 1, wherein the collaborative content item further comprises at least one of:
an audio file;
an image file;
a video file;
an executable file;
a webpage; or
a binary file.

5. The method of claim 1, wherein the respective proposed replacement text further comprises a proposed deletion of the respective text span, the proposed deletion comprising replacing the respective text span with no text.

6. The method of claim 1, wherein the respective proposed replacement text is at least one of:
an addition of text to the respective text span;
a deletion of text from the respective text span; or
a modification of text within the respective text span.

7. The method of claim 1, wherein the caused display of the respective comment includes the respective text span and the respective proposed replacement text for the respective text span.

8. The method of claim 1, further comprising:
receiving a second comment for the collaborative content item, the second comment associated with a second text span in the collaborative content item and including second proposed replacement text for the second text span;
causing display of the second comment;
responsive to receiving a second user selection of the displayed second comment, causing display of the second proposed replacement text in the collaborative content item in lieu of the second text span;
responsive to the displayed second comment not being selected, causing display of the second text span in the collaborative content item in lieu of the second proposed replacement text;
receiving a rejection instruction, the rejection instruction indicating a rejection of the second proposed replacement text; and
responsive to receiving the rejection instruction, removing the displayed second comment and displaying the second text span in the collaborative content item.

9. The method of claim 8, wherein the rejection instruction is received via a user interface element displayed in association with the second proposed replacement text.

10. The method of claim 8, further comprising storing the displayed second comment, the second text span, the second proposed replacement text, and the rejection instruction in a resolved suggestion database.

11. The method of claim 1, further comprising storing the displayed comment, the respective text span, the respective proposed replacement text, and the approval instruction in a resolved suggestion database.

12. The method of claim 1, wherein the displayed comment can receive one or more additional comments, the one or more additional comments associated with the respective text span and nested within the displayed comment.

13. The computer program product of claim 11, wherein displaying the respective comment comprises:
creating a thread, the thread having a comment list, a text span element, and a replacement text element;
associating the respective text span with the text span element of the thread;
associating the respective proposed replacement text with the replacement text element of the thread; and
associating the respective comment with the comment list of the thread.

14. The computer program product of claim 11, wherein the displayed comment is positioned adjacent to the respective text span, and wherein the approval instruction is received via a user interface element displayed in association with the respective proposed replacement text.

15. The computer program product of claim 11, wherein the collaborative content item further comprises at least one of:
an audio file;
an image file;
a video file;
an executable file;
a webpage; or
a binary file.

16. The computer program product of claim 11, wherein the respective proposed replacement text further comprises a proposed deletion of the respective text span, the proposed deletion comprising replacing the respective text span with no text.

17. The computer program product of claim 11, further comprising:
receiving a second comment for the content item, the second comment associated with a second text span associated with one of the text portions in the collaborative content item and including second proposed replacement text for the second selected text span;
displaying the second comment including the second selected text span and second proposed replacement text for the second selected text span;
receiving a user selection of the displayed second comment;
responsive to receiving the user selection of the displayed second comment, displaying the second proposed replacement text in the document in lieu of the second selected text span;
responsive to the displayed second comment no longer being selected, displaying the second selected text span in the content item in lieu of the second proposed replacement text;
receiving a rejection instruction, the rejection instruction indicating a rejection of the second proposed replacement text; and
responsive to receiving the rejection instruction, removing the displayed second comment and displaying the second selected text span in the collaborative content item.

18. The computer program product of claim 17, wherein the rejection instruction is received via a user interface element displayed in association with the second proposed replacement text.

19. The computer program product of claim 11, further comprising storing the displayed comment, the respective text span, the respective proposed replacement text, and the approval instruction in a resolved suggestion database.

20. The computer program product of claim 17, further comprising storing the displayed comment, the second selected text span, the second proposed replacement text, and the rejection instruction in a resolved suggestion database.

21. The computer program product of claim 11, wherein the displayed comment can receive one or more additional comments, the one or more additional comments associated with the respective text span and nested within the displayed comment.

22. A computer program product for suggesting replacement text in a collaborative content management system, the computer program product stored on a non-transitory computer-readable medium and including instructions adapted to cause at least one processor to execute steps comprising:
 receiving a plurality of comments from a plurality of users within a same copy of a collaborative content item stored by a collaborative content management system, the comments each associated with a respective text span in the same copy of the collaborative content item and including respective proposed replacement text for respective text spans;
 responsive to receiving a respective comment of the plurality of comments from a first user of the plurality of users, causing display of the respective comment in the same copy of the collaborative content item without causing display of the respective proposed replacement text in the text span, wherein the same copy is updated to include the respective comment, for display to an author of the collaborative content item, the first user, and a second user of the plurality of users, at a same time based on the first user and the second user being part of a first audience list that is specific to the respective comment;
 responsive to receiving a user selection of the displayed comment from the author, causing display of the respective proposed replacement text in the same copy of the collaborative content item in lieu of the respective text span while also causing display of another comment of the plurality of comments added by the second user to the author but not the first user based on the author being part of a second audience list that is specific to the another comment and the first user not being part of the second audience list, the second audience list indicating that only users that are part of the second audience list are to be enabled to see the another comment;
 responsive to the displayed comment not being selected by the author, causing display of, within the same copy of the collaborative content item, the text span in lieu of the respective proposed replacement text while also causing display of the another comment added by the second user to the author but not the first user based on the author being part of the second audience list and the first user not being part of the second audience list, wherein display of the respective proposed replacement text in the text span is not caused responsive to receiving a user selection of the displayed comment from a user other than the author;
 receiving an approval instruction for the respective proposed replacement text; and
 responsive to receiving the approval instruction, removing the displayed comment and replacing the text span in the same copy of the collaborative content item with the respective proposed replacement text.

23. A method for collaborative editing of a content item, the method comprising:
 receiving a plurality of comments from a plurality of users within a same copy of a collaborative content item stored by a collaborative content management system, the comments each associated with a respective text span in the same copy of the collaborative content item and including respective proposed replacement text for respective text spans;
 responsive to receiving a respective comment of the plurality of comments from a first user of the plurality of users, causing display of the respective comment in the same copy of the collaborative content item without causing display of the respective proposed replacement text in the text span, wherein the same copy is updated to include the respective comment, for display to an author of the collaborative content item, the first user, and a second user of the plurality of users, at a same time based on the first user and the second user being part of a first audience list that is specific to the respective comment;
 responsive to receiving a user selection of the displayed comment from the author, causing display of the respective proposed replacement text in the same copy of the collaborative content item in lieu of the respective text span while also causing display of another comment of the plurality of comments added by the second user to the author but not the first user based on the author being part of a second audience list that is specific to the another comment and the first user not being part of the second audience list, the second audience list indicating that only users that are part of the second audience list are to be enabled to see the another comment;
 responsive to the displayed comment no longer being selected by the author, causing display of, within the same copy of the collaborative content item, the text span in lieu of the respective proposed replacement text while also causing display of the another comment added by the second user to the author but not the first user based on the author being part of the second audience list and the first user not being part of the second audience list, wherein display of the respective proposed replacement text in the text span is not caused responsive to receiving a user selection of the displayed comment from a user other than the author;
 receiving a rejection instruction, the rejection instruction indicating a rejection of the respective proposed replacement text; and
 responsive to receiving the rejection instruction, removing the displayed comment and causing display of the text span in the same copy of the collaborative content item.

* * * * *